(12) United States Patent
Kanamaru et al.

(10) Patent No.: US 6,627,328 B2
(45) Date of Patent: Sep. 30, 2003

(54) LIGHT-TRANSMISSIVE EPOXY RESIN COMPOSITION AND SEMICONDUCTOR DEVICE

(75) Inventors: Tatsuya Kanamaru, Gunma-ken (JP); Tsuyoshi Honda, Gunma-ken (JP); Eiichi Asano, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 199 days.

(21) Appl. No.: 09/950,737

(22) Filed: Sep. 13, 2001

(65) Prior Publication Data

US 2002/0058145 A1 May 16, 2002

(30) Foreign Application Priority Data

Sep. 13, 2000 (JP) ........................................ 2000-277405

(51) Int. Cl.$^7$ ................................................ H01L 29/12
(52) U.S. Cl. .................... 428/620; 257/789; 257/793; 257/795; 523/457; 523/458; 523/459; 523/466
(58) Field of Search .................... 428/620; 523/457, 523/458, 459, 466; 257/789, 793, 795

(56) References Cited

U.S. PATENT DOCUMENTS 5,175,199 A    12/1992    Asano et al.

FOREIGN PATENT DOCUMENTS

| JP | A3279210 | 12/1991 |
|---|---|---|
| JP | A524882 | 2/1993 |

*Primary Examiner*—Robert Dawson
*Assistant Examiner*—D. Aylward
(74) *Attorney, Agent, or Firm*—Birch, Stewart, Kolasch & Birch, LLP

(57) ABSTRACT

An epoxy resin composition comprising (A) an epoxy resin, (B) a curing accelerator, and (C) an inorganic filler is light transmissive when it satisfies formulae (1) and (2):

$$[\{2(n_A^2+n_C^2)-(n_A+n_C)^2\}/2]^{1/2} < 3.0 \times 10^{-3} \quad (1)$$

$$[\{2(f_A^2+f_C^2)-(f_A+f_C)^2\}/2]^{1/2} < 1.0 \times 10^{-5} \quad (2)$$

wherein $n_A$ is the refractive index at $T_1°$ C. of the cured unfilled composition, $n_C$ is the refractive index at $T_1°$ C. of the inorganic filler, $f_A$ is a temperature coefficient of the refractive index of the cured unfilled composition, and $f_C$ is a temperature coefficient of the refractive index of the inorganic filler. The cured composition has improved heat resistance, humidity resistance and low stress as well as high transparency over a wide temperature range. The composition is suited for the sealing of optical semiconductor devices.

15 Claims, 1 Drawing Sheet

(b) LIGHT TRANSMITTANCE (a) REFRACTIVE INDEX

LIGHT-TRANSMISSIVE EPOXY RESIN COMPOSITION AND SEMICONDUCTOR DEVICE

This invention relates to epoxy resin compositions of inorganic filler loading type suitable as a sealing material for optical semiconductor and affording cured products having high transparency in various temperature environments, and semiconductor devices sealed with the compositions in a cured state.

BACKGROUND OF THE INVENTION

While the recent advance of the information technology requires effective transmission and processing of a vast quantity of information bits, what is now under investigation as a substitute for conventional signal transmission through electrical wiring is semiconductor devices which take advantage of the high speed, low loss, non-induction and other desirable features of optical signals and mounting technology used therefor.

Most of prior art opto-functional devices are sealed with epoxy resins which are free of inorganic filler in order that the resin layer be transparent. Such unfilled epoxy resins are not satisfactory when the heat resistance, humidity resistance and low stress property of cured parts are taken into account. There is a need for a transparent sealant which contains an inorganic filler.

SUMMARY OF THE INVENTION

An object of the invention is to provide a light-transmissive epoxy resin composition of inorganic filler loading type which is suitable as a sealing material for optical semiconductor and affords cured products maintaining high transparency in various temperature environments. Another object is to provide a semiconductor device sealed with the epoxy resin composition.

It has been found that when an epoxy resin composition comprising an epoxy resin, a curing accelerator, and an inorganic filler as essential components satisfies both the relationships of the following formulae (1) and (2), cured products thereof maintain high transparency in varying temperature environments.

Accordingly, the invention provides a light-transmissive epoxy resin composition comprising (A) an epoxy resin, (B) a curing accelerator, and (C) an inorganic filler, wherein the composition satisfies both the relationships of the following formulae (1) and (2).

$$[\{2(n_A^2+n_C^2)-(n_A+n_C)^2\}/2]^{1/2} < 3.0 \times 10^{-3} \quad (1)$$

$$[\{2(f_A^2+f_C^2)-(f_A+f_C)^2\}/2]^{1/2} < 1.0 \times 10^{-5} \quad (2)$$

Herein $n_A$ is the refractive index at $T_1°$ C. of the cured product of the composition excluding the inorganic filler, $n_C$ is the refractive index at $T_1°$ C. of the inorganic filler, $f_A$ is a temperature coefficient of the refractive index of the cured product of the composition excluding the inorganic filler, $f_C$ is a temperature coefficient of the refractive index of the inorganic filler, and the temperature coefficient of refractive index is given by the formula (3):

$$f=\{n(T_2)/n(T_1)-1\}/(T_2-T_1) \quad (3)$$

wherein $n(T_1)$ is the refractive index at $T_1°$ C. and $n(T_2)$ is the refractive index at $T_2°$ C., with the proviso that $T_1 < T_2$.

Also provided is a semiconductor device sealed with the epoxy resin composition in a cured state.

DESCRIPTION OF THE PREFERRED EMBODIMENTS

The light-transmissive epoxy resin composition of the invention includes (A) an epoxy resin, (B) a curing accelerator, and (C) an inorganic filler as essential components and optionally, a curing agent and other components. The type and amount of these components are selected such that the composition may satisfy both the relationships of the formulae (1) and (2).

$$[\{2(n_A^2+n_C^2)-(n_A+n_C)^2\}/2]^{1/2} < 3.0 \times 10^{-3} \quad (1)$$

$$[\{2(f_A^2+f_C^2)-(f_A+f_C)^2\}/2]^{1/2} < 1.0 \times 10^{-5} \quad (2)$$

In formula (1), $n_A$ is the refractive index at temperature $T_1°$ C. of the cured product of the composition excluding the inorganic filler, and $n_C$ is the refractive index at temperature $T_1°$ C. of the inorganic filler. Formula (1) means that the standard deviation of the refractive index of the cured product of the unfilled composition on the basis of the refractive index of the inorganic filler is less than $3.0 \times 10^{-3}$. For the sake of brevity, the term "filled composition" is used to denote an epoxy resin composition comprising an epoxy resin, a curing accelerator, and an inorganic filler, and "unfilled composition" used to denote an epoxy resin composition comprising an epoxy resin and a curing accelerator, but excluding an inorganic filler.

In formula (2), $f_A$ is a temperature coefficient of the refractive index of the cured product of the unfilled composition, and $f_C$ is a temperature coefficient of the refractive index of the inorganic filler. The temperature coefficient $f_A$ or $f_C$ of refractive index is given by the formula (3):

$$f=\{n(T_2)/n(T_1)-1\}/(T_2-T_1) \quad (3)$$

wherein $n(T_1)$ is the refractive index of the cured product of the unfilled composition or the inorganic filler at $T_1°$ C. and $n(T_2)$ is the refractive index of the cured product of the unfilled composition or the inorganic filler at $T_2°$ C., with the proviso that $T_1$ is lower than $T_2$. Formula (2) means that the standard deviation of the temperature coefficient of the refractive index of the cured product of the unfilled composition on the basis of the temperature coefficient of the refractive index of the inorganic filler is less than $1.0 \times 10^{-5}$.

Figure 1:
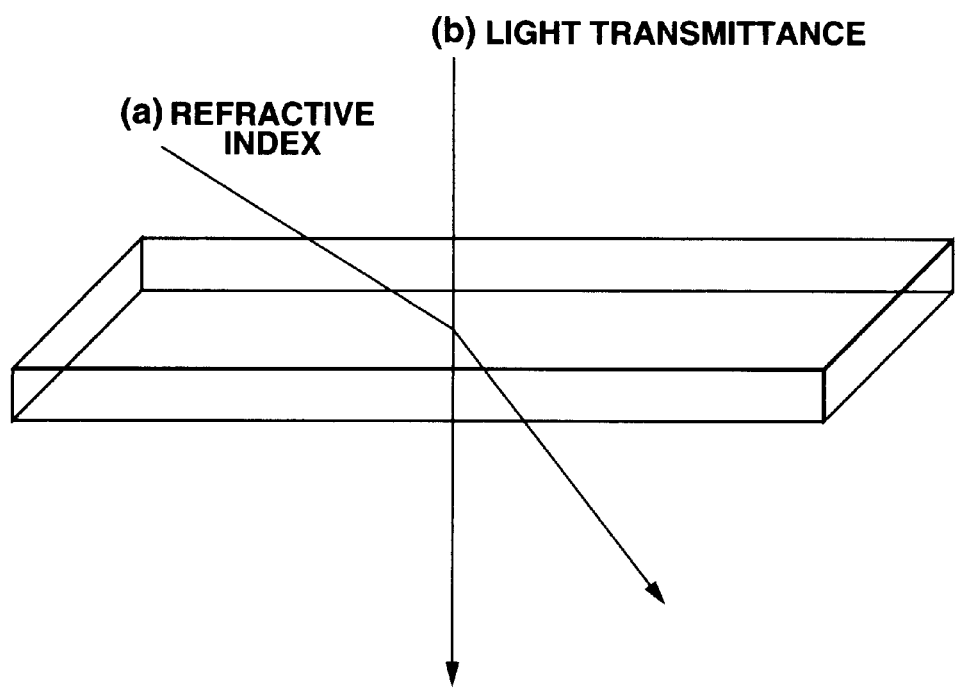
FIG. 1 schematically illustrates the measurement of refractive index and transmittance of a sample.

The measurement of a refractive index is now described. The refractive index $n_A$ is measured by furnishing the unfilled epoxy resin composition, molding and curing the composition under conventional conditions into a sample as shown in FIG. 1, for example, and measuring the refractive index thereof. The refractive index $n_C$ of the inorganic filler is measured by dispersing the inorganic filler in a solvent mixture of dimethylsulfoxide ($n_D$=1.4783 at 25° C.) and 1-chloronaphthalene ($n_D$=1.6305 at 25° C.) in a weight ratio of inorganic filler/solvent mixture of 50/50, and determining the refractive index of the solvent mixture at which the dispersion exhibits a light transmittance of at least 99.9% at each wavelength of 1600 nm, 900 nm and 600 nm, that refractive index being regarded as the refractive index of the inorganic filler.

The temperature coefficients $f_A$ and $f_C$ of refractive indexes are determined from the refractive indexes $n_A$ and $n_C$ measured at temperatures $T_1$ and $T_2$ according to the above-described procedure. Preferably $T_1$ is set in the range of 10 to 50° C., especially 20 to 40° C., and $T_2$ is set in the range of 60 to 120° C., especially 80 to 100° C.

The standard deviation of refractive index given by $[\{2(n_A{}^2+n_C{}^2)-(n_A+n_C)^2\}/2]^{1/2}$ is less than $3.0\times10^{-3}$, usually 0 to $2.5\times10^{-3}$, preferably 0 to $2.2\times10^{-3}$, more preferably 0 to $1.5\times10^{-3}$, and most preferably 0 to $0.8\times10^{-3}$. If this value is more than $3.0\times10^{-3}$, the cured product has a reduced light transmittance, compromising the object of the invention.

The standard deviation of refractive index's temperature coefficient given by $[\{2(f_A{}^2+f_C{}^2)-(f_A+f_C)^2\}/2]^{1/2}$ is less than $1.0\times10^{-5}$, preferably 0 to $0.9\times10^{-5}$, more preferably 0 to $0.5\times10^{-5}$, most preferably 0 to $0.2\times10^{-5}$. If this value is more than $1.0\times10^{-5}$, the cured product, which is transparent at a certain temperature, lowers its light transmittance as the temperature changes therefrom, compromising the object of the invention.

In the epoxy resin composition of the invention, the epoxy resin (A) is not particularly limited in molecular structure and molecular weight. An epoxy resin having a low temperature coefficient of refractive index is preferred when the relationships of formulae (1) and (2) relating to the refractive index and its temperature coefficient of the cured product of the unfilled epoxy resin composition and the inorganic filler are taken into account.

Illustrative examples of suitable epoxy resins include bisphenol-type epoxy resins such as bisphenol A epoxy resin, bisphenol F epoxy resin and bisphenol S epoxy resin, novolac-type epoxy resins such as phenolic novolac epoxy resin and cresol novolac epoxy resin, triphenolalkane-type epoxy resins such as triphenolmethane epoxy resin and triphenolpropane epoxy resin, phenolaralkyl-type epoxy resins, biphenylaralkyl-type epoxy resins, stilbene-type epoxy resins, naphthalene-type epoxy resins, biphenyl-type epoxy resins, cyclopentadiene-type epoxy resins, and alicyclic epoxy resins. Of these, epoxy resins having at least one naphthalene ring in a molecule are preferred. Mixtures of naphthalene type epoxy resins of the following formulae (4) and (5) are more preferred. With the viscosity of the composition taken into account, it is recommended that the naphthalene type epoxy resin of formula (5) account for 90 to 100% by weight, especially 95 to 100% by weight of all the naphthalene type epoxy resins, and the balance of 0 to 10% by weight, especially 0 to 5% by weight be the naphthalene type epoxy resin of formula (4).

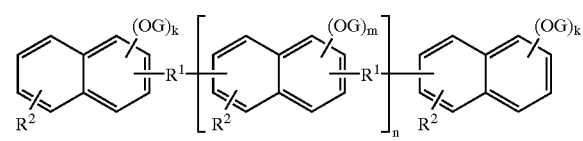

(4)

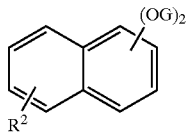

(5)

Herein $R^1$ is a group represented by

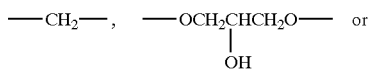

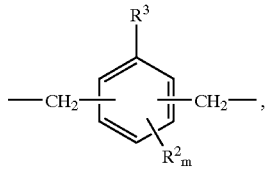

$R^2$ is independently hydrogen or an alkyl group of 1 to 6 carbon atoms, $R^3$ is hydrogen or a group represented by

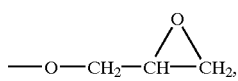

OG is 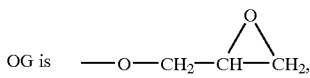

k is 1 or 2, m is an integer of 0 to 2, and n is an integer inclusive of 0, desirably an integer of 0 to 3, and more desirably 0 or 1.

Naphthalene type epoxy resins of the following general formula (6) are especially desirable.

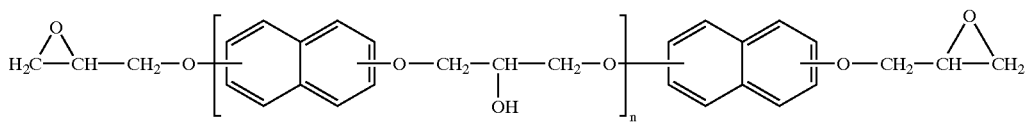

(6)

Herein n is an integer inclusive of 0, desirably an integer of 0 to 5, and more desirably 0 or 1.

The mixing ratio of epoxy resins is not critical. To reduce the temperature coefficient of refractive index, it is desirable that the naphthalene type epoxy resins account for 10 to 100%, more desirably 25 to 100%, even more desirably 60 to 100% by weight of all the epoxy resins. If the proportion of naphthalene type epoxy resins is below the range, cured products can be transparent at certain temperatures, but opaque at other temperatures.

The curing accelerator (B) used herein is not critical although it is preferably selected depending on whether or not the curing agent is used or the type of curing agent if used. Where the epoxy resin is cured alone (selfpolymerization type epoxy resin), relatively strong basic compounds such as imidazole compounds are desirable. Where the epoxy resin is cured with curing agents such as acid anhydrides or phenolic resins (acid anhydride curing type or phenol curing type epoxy resin), even relatively weak basic compounds such as organophosphorus compounds are employable as well as imidazole compounds. Illustrative examples of suitable imidazole compounds include 2-methylimidazole, 2-ethylimidazole, 4-methylimidazole, 4-ethylimidazole, 2-phenylimidazole, 2-phenyl-4-methylimidazole, 2-phenyl-4-hydroxymethylimidazole, 2-ethyl-4-methylimidazole, 1-cyanoethyl-2-methylimidazole, 2-phenyl-4-methyl-5-hydroxymethylimidazole, and 2-phenyl-4,5-dihydroxymethylimidazole. Organophosphorus compounds that may be used herein include triorganophosphines such as triphenylphosphine, tributylphosphine, tri(p-methylphenyl) phosphine, tri(nonylphenyl)phosphine, tri(p-toluyl) phosphine, tri(p-methoxyphenyl)phosphine, tri(p-ethoxyphenyl)phosphine, and triphenylphosphine-triphenylboran; and organophosphines and derivatives thereof, for example, quaternary phosphonium salts such as tetraphenylphosphonium tetraphenylborate. Of these, combinations of acid anhydride curing agents with imidazole compounds or organophosphine compounds are desirable because of the transparency of cured products.

The amount of the curing accelerator added is not critical although an appropriate amount is about 0.1 to 40 parts by weight per 100 parts by weight of the epoxy resin. Particularly when the epoxy resin is cured alone, about 1 to 40 parts by weight of the curing accelerator is used per 100 parts by weight of the epoxy resin. Where curing agents such as acid anhydrides and phenolic resins are used, about 0.1 to 20 parts by weight of the curing accelerator is used per 100 parts by weight of the epoxy resin. An amount of the curing accelerator below the range may invite losses of humidity resistance and heat resistance due to undercure. With an amount of the curing accelerator beyond the range, the composition in uncured state may become unstable during storage.

Component (C) may be any type of inorganic filler. Suitable fillers include crystalline or amorphous silica, talc, mica, silicon nitride, boron nitride and alumina. The only requirement is that the filler be selected so that the relationships of formulae (1) and (2) may be met by the refractive indexes of the cured product of the unfilled composition and the inorganic filler and their temperature coefficients. Therefore, a filler having a relatively high refractive index and a low temperature coefficient of refractive index is desirable. In this sense, it is desirable to use an amorphous silica-titania co-melt, also known as silica-titania glass.

The amorphous silica-titania co-melt (i.e., silica-titania glass) may be prepared by a conventional sol-gel process using an alkoxysilane and an alkoxytitanium as starting reactants. Then the refractive index of the inorganic filler can be adjusted in terms of the blending proportion of reactants. An appropriate blending proportion of reactants, that is, alkoxysilane/alkoxytitanium is in the range from 99/1 to 50/50, especially from 90/10 to 70/30 in molar ratio. If the blending proportion of reactants is outside the range, the refractive index of the inorganic filler may largely differ from that of the cured product of the unfilled composition, resulting in the cured product of the filled composition becoming opaque.

The shape and particle size of amorphous silica-titania co-melt are not critical and may be selected in accordance with a particular application. For use as an underfill for flip-chip type semiconductor devices, for example, the preferred co-melt has an irregular shape with no acute corners or spherical shape as well as an average particle size at most about one-tenth as large and a maximum particle size at most one-half as large as the gap between the substrate and chip in a flip-chip semiconductor device. Specifically, the average particle size is usually up to 10 $\mu$m, preferably 0.5 to 10 $\mu$m, more preferably 1 to 5 $\mu$m and the maximum particle size is up to 50 $\mu$m, preferably up to 25 $\mu$m, and more preferably up to 12 $\mu$m. The average particle size may be suitably determined as the weight average value or median diameter, for example, by laser diffraction analysis.

The amount of amorphous silica-titania co-melt added is not critical although it is desirable from the requirement of formulae (1) and (2) for the co-melt to account for 10% to 100% by weight, more preferably 30% to 100% by weight, and most preferably 50% to 100% by weight of all inorganic fillers. If the amount of amorphous silica-titania co-melt added is below the range, cured products may become opaque. The addition amount of all inorganic fillers including the amorphous silica-titania co-melt is preferably about 50 to 1,000 parts, especially about 100 to 500 parts by weight per 100 parts by weight of the total of other components. If the amount of inorganic filler added is below the range, cured products may lose, in part, heat resistance, humidity resistance and low stress property. An excessive amount of inorganic filler may provide an uncured composition with an extremely increased viscosity, compromising the working efficiency.

In the epoxy resin composition of the invention, a curing agent may be added as component (D). Illustrative of the curing agent are acid anhydrides, phenolic resins, and amine compounds, with the acid anhydrides being desirable for the transparency of cured products. The type of the acid anhydride is not critical although preferred acid anhydrides include aliphatic acid anhydrides such as dodecenylsuccinic anhydride, polyadipic anhydride, polyazelaic anhydride and polysebacic anhydride; alicyclic acid anhydrides such as methyltetrahydrophthalic anhydride, methylhexahydrophthalic anhydride, hymic anhydride, hexahydrophthalic anhydride, tetrahydrophthalic anhydride, trialkyltetrahydrophthalic anhydride and methylcyclohexane dicarboxylic anhydride.

The amount of acid anhydride blended is not critical although an appropriate amount is to give an epoxy resin/acid anhydride ratio between 100/50 and 100/200, and especially between 100/80 and 100/125 in equivalent ratio. An amount of the acid anhydride outside the range can sometimes cause undercure, resulting in losses of humidity resistance and heat resistance.

In the epoxy resin composition, other additives such as flame retardants, coupling agents and thermoplastic resins may be blended insofar as they do not compromise the objects of the invention.

When the epoxy resin composition of the invention is prepared, the respective components may be blended in any desired order and mixed in any desired way. For example, a pre-blend of the components is mixed in a two-roll mill, three-roll mill, kneader or mixer of any desired type while heating if desired.

The epoxy resin composition is obtained in a solid or liquid state. In the solid state, it is used in the form of granules, tablets or film. In the liquid state, it is used as being filled in a suitable container such as a syringe. The epoxy resin composition is usually cured by heating at a temperature of about 100 to 150° C. for about 1 to 6 hours.

Since the epoxy resin composition cures into a product which exhibits and maintains high transparency in various temperature environments, it is best suited for use with optical semiconductor devices. Typical applications include sealants for light emitting and receiving devices and interfacial adhesives for optical communication ICs and LSIs.

EXAMPLE

Examples of the invention and comparative examples are given below by way of illustration, and are not intended to limit the invention.

Example 1–3 and Comparative Examples 1–2

Epoxy resin compositions were prepared by blending epoxy resins A and B, a curing accelerator (2E4MZ: 2-ethyl-4-methylimidazole), inorganic fillers A to D (amorphous silica-titania co-melt obtained by a sol-gel process) shown in Table 1, and a curing agent (4MTHPA: 4-methyltetrahydrophthalic anhydride) according to the formulation shown in Table 2, followed by intimate mixing.

Each epoxy resin composition was cured under conditions: 100° C./1 hour plus 150° C./4 hours into a test sample of 10 mm×50 mm×0.1 mm (optical path length) as shown in FIG. 1.

Figure 2:
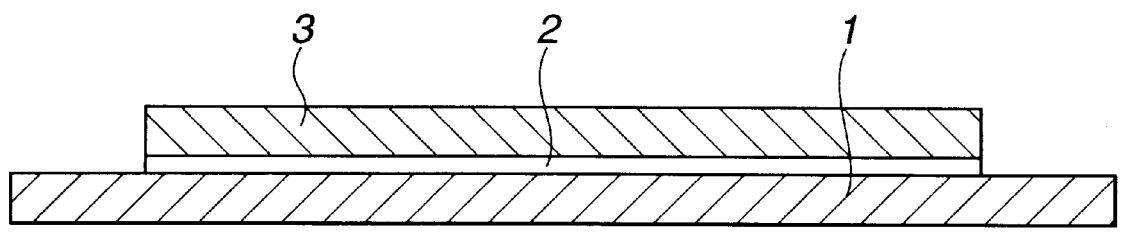
FIG. 2 is a schematic cross-sectional view of a semiconductor device to which the invention is applied.

Separately, a semiconductor device as shown in FIG. 2 was prepared by coating each epoxy resin composition on a BT substrate 1 as a coating 2 of 10 mm×10 mm×0.1 mm, on which a silicon chip 3 of 10 mm×10 mm×0.3 mm was placed. The composition was cured under conditions: 100° C./1 hour plus 150° C./4 hours, completing the device.

These epoxy resin compositions were examined by the following tests (a) to (d). The results are shown in Table 2.

(a) Refractive index and Temperature Coefficient

For the cured products of unfilled epoxy resin compositions, test samples as shown in FIG. 1 were prepared under the same conditions as used for the cured products of the filled epoxy resin compositions. These samples were measured for refractive index $n_A$. The refractive index $n_C$ of an inorganic filler was measured by dispersing the inorganic filler in a solvent mixture of dimethylsulfoxide ($n_D$=1.4783 at 25° C.) and 1-chloronaphthalene ($n_D$=1.6305 at 25° C.) in a weight ratio of inorganic filler/solvent mixture of 50/50, and determining the refractive index $n_C$ of the solvent mixture when the dispersion exhibited a light transmittance of at least 99.9% at each wavelength of 1600 nm, 900 nm and 600 nm. Measurements were made at 25° C. (=$T_1$) and 100° C. (=$T_2$). It is noted that the mixing ratio of solvents in the solvent mixture was not fixed. Instead, a number of solvent mixtures having different mixing ratios were furnished, the inorganic filler was dispersed therein, the dispersed systems were observed for transparency, and the refractive index of the solvent mixture from which a transparent system was obtained was regarded as the refractive index of the inorganic filler. From the refractive indexes $n_A$ and $n_C$ at 25° C. (=$T_1$) and 100° C. (=$T_2$), their temperature coefficients $f_A$ and $f_C$ were calculated according to formula (3).

$$f=\{n(T_2)/n(T_1)-1\}/(T_2-T_1) \quad (3)$$

(b) Light Transmittance

The test sample of FIG. 1 was measured for light transmittance at a wavelength of 1600 nm, 900 nm and 600 nm and a temperature of 25° C. and 100° C.

(c) Solder Crack Resistance after Moisture Absorption

A semiconductor device as shown in FIG. 2 was allowed to stand for 24 hours in an atmosphere of 121° C., RH 100% and 2 atm. It was immersed for 10 seconds in a solder bath at 240° C. The number of cracked samples per the total number of tested samples is reported.

(d) Thermal Cycling Test

A semiconductor device as shown in FIG. 2 was immersed for 10 seconds in a solder bath at 240° C. and then for 10 seconds in liquid nitrogen. The number of cracked samples after ten cycles per the total number of tested samples is reported.

Epoxy resin A: epoxy equivalent 141

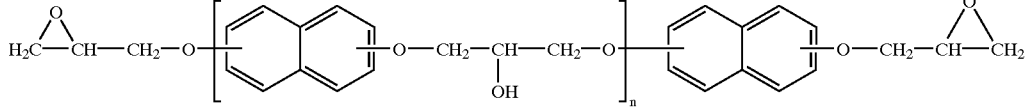

n=0.046

Epoxy resin B: epoxy equivalent 172

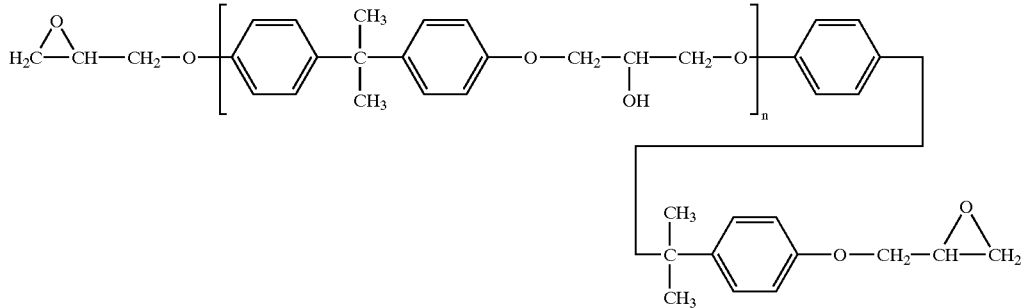

n=0.014

TABLE 1

| Inorganic filler | Blending ratio (mol %) | | Average particle size (μm) | Maximum particle size (μm) |
|---|---|---|---|---|
| | SiO$_2$ | TiO$_2$ | | |
| A | 85 | 15 | 4.5 | ≦12 |
| B | 86 | 14 | 3.8 | ≦12 |
| C | 87 | 13 | 4.8 | ≦12 |
| D | 88 | 12 | 4.2 | ≦12 |

TABLE 2

| Composition (pbw) | Example 1 | Example 2 | Example 3 | Comparative Example 1 | Comparative Example 2 |
|---|---|---|---|---|---|
| Epoxy resin A | 62.6 | 40.1 | 18.9 | 0 | 62.6 |
| Epoxy resin B | 0 | 24.1 | 46.8 | 67.2 | 0 |
| 2E4MZ | 1 | 1 | 1 | 1 | 1 |
| Inorganic filler A | 100 | 0 | 0 | 0 | 0 |
| Inorganic filler B | 0 | 100 | 0 | 0 | 0 |
| Inorganic filler C | 0 | 0 | 100 | 0 | 0 |
| Inorganic filler D | 0 | 0 | 0 | 100 | 0 |
| 4MTHPA | 37.4 | 35.8 | 34.3 | 32.8 | 37.4 |
| (a) Refractive index | | | | | |
| $n_A$ | 1.545 | 1.541 | 1.538 | 1.535 | 1.545 |
| $n_C$ | 1.544 | 1.539 | 1.535 | 1.530 | — |
| formula (1) ($\times 10^{-3}$) | 0.707 | 1.414 | 2.121 | 3.536 | — |
| (a) Temperature coefficient | | | | | |
| $f_A$ ($\times 10^{-5}$) | 6.1 | 6.9 | 7.7 | 8.6 | 6.1 |
| $f_C$ ($\times 10^{-5}$) | 6.0 | 6.2 | 6.5 | 6.7 | — |
| formula (2) ($\times 10^{-5}$) | 0.07 | 0.49 | 0.85 | 1.34 | — |
| (b) Transmittance at 25 °C. | | | | | |
| 1600 nm | 100 | 100 | 100 | 100 | 100 |
| 900 nm | 100 | 100 | 100 | 100 | 100 |
| 600 nm | 100 | 99 | 99 | 98 | 100 |
| (b) Transmittance at 100° C. | | | | | |
| 1600 nm | 100 | 100 | 100 | 95 | 100 |
| 900 nm | 100 | 98 | 97 | 80 | 100 |
| 600 nm | 100 | 96 | 95 | 70 | 100 |
| (c) Solder crack resistance | 0/20 | 0/20 | 0/20 | 0/20 | 20/20 |
| (d) Thermal cycling test | 0/20 | 0/20 | 0/20 | 0/20 | 20/20 |

Note:
formula (1) = $[\{2(n_A^2 + n_C^2) - (n_A + n_C)^2\} / 2]^{1/2}$
formula (2) = $[\{2(f_A^2 + f_C^2) - (f_A + f_C)^2\} / 2]^{1/2}$ There has been described an epoxy resin composition which in the cured state maintains high transparency in various temperature environments and has improved heat resistance, humidity resistance and low stress property. When the composition is used in sealing of optical semiconductor devices, typically as sealants for light emitting and receiving devices and interfacial adhesives for optical communication ICs and LSIs, excellent performance is exerted in differing temperature environments.

Japanese Patent Application No. 2000-277405 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A light-transmissive epoxy resin composition comprising (A) an epoxy resin, (B) a curing accelerator, and (C) an inorganic filler, wherein said composition satisfies both the relationships of the following formulae (1) and (2):

$$[\{2(n_A^2+n_C^2)-(n_A+n_C)^2\}/2]^{1/2} < 3.0 \times 10^{-3} \quad (1)$$

$$[\{2(f_A^2+f_C^2)-(f_A+f_C)^2\}/2]^{1/2} < 1.0 \times 10^{-5} \quad (2)$$

wherein $n_A$ is the refractive index at $T_1$° C. of the cured product of the composition excluding the inorganic filler, $n_C$ is the refractive index at $T_1$° C. of the inorganic filler, $f_A$ is a temperature coefficient of the refractive index of the cured product of the composition excluding the inorganic filler, $f_C$ is a temperature coefficient of the refractive index of the inorganic filler, and the temperature coefficient of refractive index is given by the formula (3):

$$f=\{n(T_2)/n(T_1)-1\}/(T_2-T_1) \quad (3)$$

wherein $n(T_1)$ is the refractive index at $T_1$° C. and $n(T_2)$ is the refractive index at $T_2$° C., with the proviso that $T_1 < T_2$.

2. The epoxy resin composition of claim 1 wherein $T_1$ is 10 to 50° C., and $T_2$ is 60 to 120° C.

3. The epoxy resin composition of claim 1 wherein component (A) is an epoxy resin having at least one naphthalene ring in a molecule.

4. The epoxy resin composition of claim 1 wherein component (A) is a mixture of an epoxy resin of the following general formula (4) and an epoxy resin of the following general formula (5):

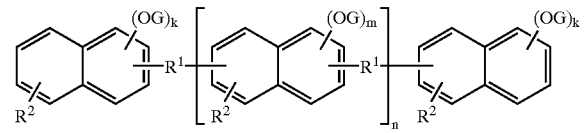

(4)

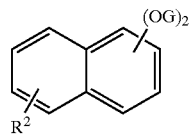

(5)

wherein $R^1$ is a group represented by

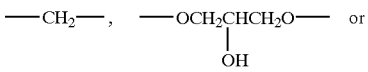

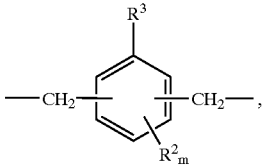

$R^2$ is independently hydrogen or an alkyl group of 1 to 6 carbon atoms, $R^3$ is hydrogen or a group represented by

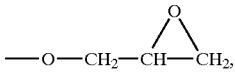

OG is

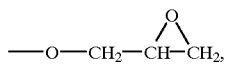

k is 1 or 2, m is an integer of 0 to 2, and n is an integer inclusive of 0.

5. The epoxy resin composition of claim 1 wherein component (A) is an epoxy resin of the following general formula (6):

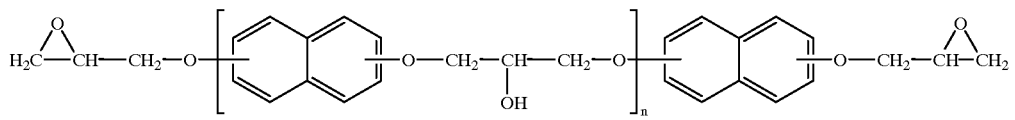

(6)

wherein n is an integer inclusive of 0.

6. The epoxy resin composition of claim 1 wherein inorganic filler (C) is an amorphous silica-titania co-melt.

7. The epoxy resin composition of claim 1 further comprising (D) an acid anhydride curing agent.

8. A semiconductor device sealed with the epoxy resin composition of claim 1 in a cured state.

9. The light-transmissive epoxy resin composition of claim 1, wherein the standard deviation of the refractive index give by formula (1) is from 0 to $2.2 \times 10^{-3}$.

10. The light-transmissive epoxy resin composition of claim 1, wherein the standard deviation of the refractive index give by formula (1) is from 0 to $0.8 \times 10^{-3}$.

11. The light-transmissive epoxy resin composition of claim 1, wherein the standard deviation of the temperature coefficient of the refractive index give by formula (2) is from 0 to $0.9 \times 10^{-5}$.

12. The light-transmissive epoxy resin composition of claim 1, wherein the standard deviation of the temperature coefficient of the refractive index give by formula (2) is from 0 to $0.2 \times 10^{-5}$.

13. The light-transmissive epoxy resin composition of claim 1, wherein component (B) is a combination of an acid anhydride curing agent with an imidazole compound or an organophosphine compound.

14. The light-transmissive epoxy resin composition of claim 1, wherein component (C) comprises a member selected from the group consisting of crystalline or amorphous silica, talc, mica, silicon nitride, boron nitride, and alumina.

15. The light-transmissive epoxy resin composition of claim 7, wherein component (D) is selected from the group consisting of aliphatic acid anhydrides and alicyclic acid anhydrides.

* * * * *